United States Patent
Vollmer

(10) Patent No.: US 9,555,821 B2
(45) Date of Patent: Jan. 31, 2017

(54) STANDSTILL DETERMINATION IN A RAIL VEHICLE

(71) Applicant: KNORR-BREMSE SYSTEME FÜR SCHIENENFAHRZEUGE GMBH, Munich (DE)

(72) Inventor: Achim Vollmer, Höhenkirchen-Siegertsbrunn (DE)

(73) Assignee: KNORR-BREMSE SYSTEME FUR SCHIENENFAHRZEGUE GMBH, Munich (DE)

( * ) Notice: Subject to any disclaimer, the term of this patent is extended or adjusted under 35 U.S.C. 154(b) by 101 days.

(21) Appl. No.: 14/425,356

(22) PCT Filed: Sep. 2, 2013

(86) PCT No.: PCT/EP2013/068053
§ 371 (c)(1),
(2) Date: Mar. 3, 2015

(87) PCT Pub. No.: WO2014/033290
PCT Pub. Date: Mar. 6, 2014

(65) Prior Publication Data
US 2015/0251672 A1    Sep. 10, 2015

(30) Foreign Application Priority Data
Sep. 3, 2012 (DE) .................. 10 2012 108 171

(51) Int. Cl.
*B61L 13/00* (2006.01)
*B61L 13/04* (2006.01)
(Continued)

(52) U.S. Cl.
CPC ............... *B61L 13/04* (2013.01); *B61C 17/00* (2013.01); *B61L 3/00* (2013.01); *B61L 23/00* (2013.01);
(Continued)

(58) Field of Classification Search
CPC ............. B61L 13/04; B61L 3/00; B61L 23/00; B61L 25/021; B61L 15/0036; B61C 17/00; G01P 13/00
See application file for complete search history.

(56) References Cited

U.S. PATENT DOCUMENTS 2,994,764 A * 8/1961 Witmer ................... B61L 1/161
246/2 R
3,526,378 A * 9/1970 Thorne-Booth ...... B61L 23/166
246/122 R
(Continued)

FOREIGN PATENT DOCUMENTS

CN    101049833 A    10/2007
DE    102006034127 A1    1/2008
(Continued)

OTHER PUBLICATIONS

Chinese Office Action dated Jan. 28, 2016.
(Continued)

*Primary Examiner* — Jason C Smith
(74) *Attorney, Agent, or Firm* — Barnes & Thornburg LLP

(57) ABSTRACT

A control arrangement for a rail vehicle, having at least one control device which is or can be connected for the purpose of receiving sensor signals, wherein the sensor signals each represent at least one speed, and having at least one bus connection which is used or can be used to connect the control device to a data bus of the rail vehicle for interchanging data. The control device creates a standstill signal on the basis of the sensor signals and transmits the standstill signal onto the data bus. Also disclosed is a standstill determination device which can receive standstill signals via the data bus, wherein the standstill determination device determines, on the basis of standstill signals received via the
(Continued)

data bus, whether the rail vehicle is at a standstill. Also disclosed is a rail vehicle and a method for determining a standstill of a rail vehicle.

12 Claims, 1 Drawing Sheet

(51) Int. Cl.
  *B61C 17/00* (2006.01)
  *B61L 25/02* (2006.01)
  *B61L 3/00* (2006.01)
  *B61L 23/00* (2006.01)
  B61L 15/00 (2006.01)
  G01P 13/00 (2006.01)

(52) U.S. Cl.
  CPC .......... *B61L 25/021* (2013.01); *B61L 15/0036* (2013.01); *G01P 13/00* (2013.01)

(56) References Cited

U.S. PATENT DOCUMENTS

| | | | | |
|---|---|---|---|---|
| 4,752,053 A * | 6/1988 | Boetzkes | B61L 23/00 246/167 R |
| 5,437,422 A * | 8/1995 | Newman | B61L 27/0038 246/182 R |
| 5,462,244 A * | 10/1995 | Van Der Hoek | B61L 1/06 246/122 R |
| 5,868,360 A * | 2/1999 | Bader | B61L 29/284 246/202 |
| 6,195,020 B1 * | 2/2001 | Brodeur, Sr. | B61L 29/22 246/125 |
| 6,290,187 B1 * | 9/2001 | Egami | B61L 23/06 246/122 R |
| 6,292,112 B1 * | 9/2001 | Bader | G08G 1/042 246/202 |
| 2007/0084972 A1 * | 4/2007 | Riley | B61L 1/14 246/77 |
| 2008/0169385 A1 * | 7/2008 | Ashraf | B61L 29/22 246/130 |
| 2011/0091077 A1 | 4/2011 | Puchert | |
| 2012/0037761 A1 * | 2/2012 | Bock | B61L 7/06 246/125 |
| 2013/0062474 A1 * | 3/2013 | Baldwin | B61L 29/282 246/122 R |
| 2013/0193276 A1 * | 8/2013 | Hunter | B61L 25/025 246/122 R |
| 2013/0248659 A1 * | 9/2013 | Lingvall | B61L 29/28 246/126 |
| 2015/0108284 A1 * | 4/2015 | Pirtle | B61L 27/00 246/4 |
| 2015/0175179 A1 * | 6/2015 | Green | B61L 19/06 246/27 |
| 2015/0251672 A1 * | 9/2015 | Vollmer | B61C 17/00 246/182 R |
| 2015/0344050 A1 * | 12/2015 | Yanai | B61L 21/04 246/3 |
| 2016/0075356 A1 * | 3/2016 | Kull | B61L 23/044 246/121 |
| 2016/0107664 A1 * | 4/2016 | Kull | B61L 23/044 246/121 |

FOREIGN PATENT DOCUMENTS

| | | | |
|---|---|---|---|
| DE | WO 2009150086 A1 * | 12/2009 | ............ B61L 25/025 |
| DE | 102009020428 A1 | 5/2010 | |
| DE | 102010061878 A1 | 5/2012 | |
| EP | 1473210 A1 | 11/2004 | |
| WO | 2009150086 A1 | 12/2009 | |

OTHER PUBLICATIONS

International Preliminary Report on Patentability for International Patent Application No. PCT/EP2013/068053; Mar. 3, 2015.
Written Opinion for International Patent Application No. PCT/EP2013/068053; Jan. 29, 2015.
Search Report for German Patent Application No. 10 2012 108 171.9; Dec. 2, 2013.
Search Report for International Patent Application No. PCT/EP2013/068053; Jan. 29, 2015.

* cited by examiner

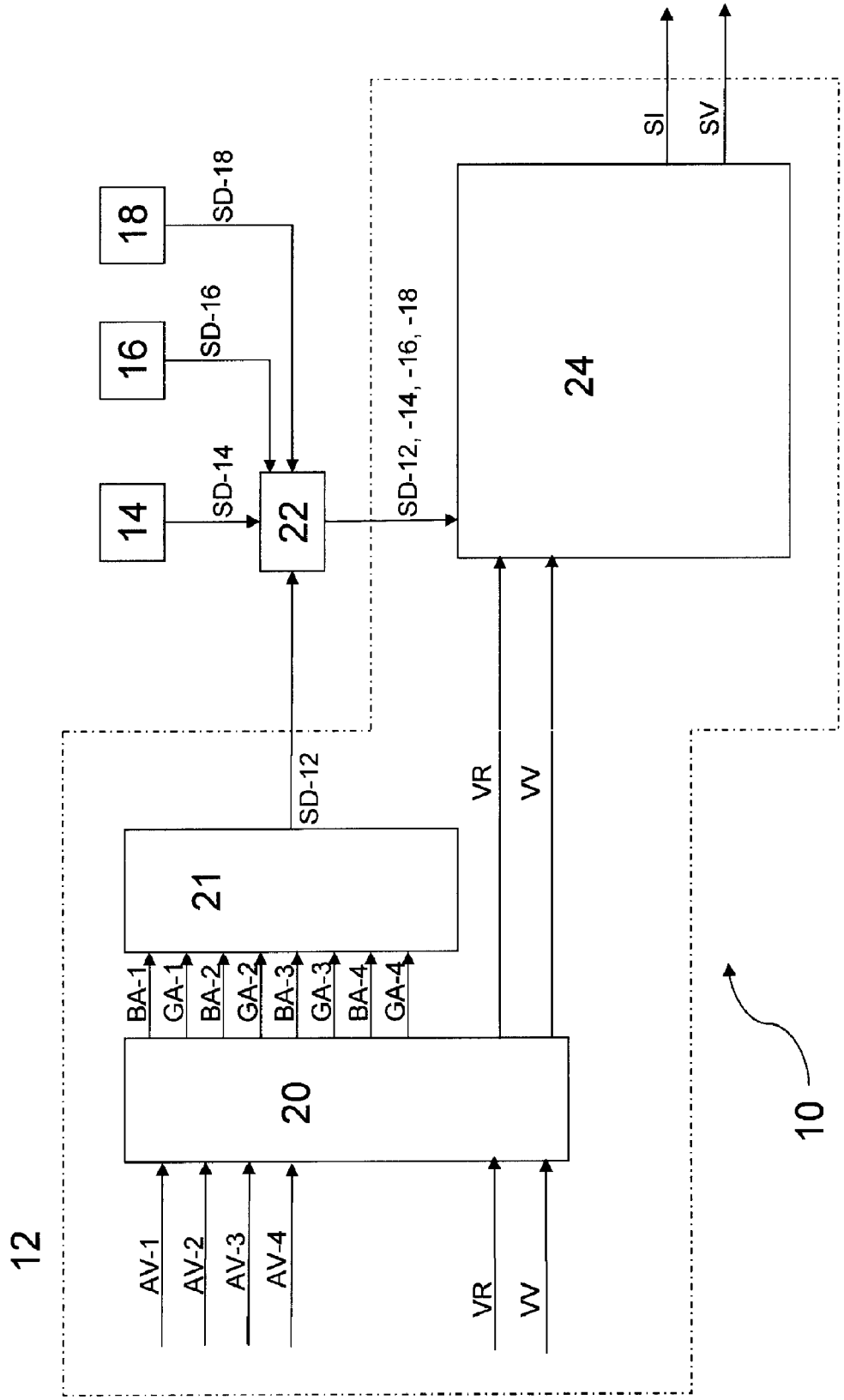

STANDSTILL DETERMINATION IN A RAIL VEHICLE

PRIORITY CLAIM

This patent application is a U.S. National Phase of International Patent Application No. PCT/EP2013/068053, filed Sep. 2, 2013, which claims priority to German Patent Application No. 10 2012 108 171.9, filed Sep. 3, 2012, the disclosures of which are incorporated herein by reference in their entirety.

FIELD

Disclosed embodiments relate to a control arrangement for a rail vehicle that is able to determine a standstill state of the rail vehicle. Moreover, disclosed embodiments relate to a rail vehicle with such a control arrangement and a corresponding method.

BACKGROUND

With rail vehicles, different functions are dependent upon whether a vehicle is at a standstill or not. For example, a door opening function is generally only enabled if a standstill state exists. The determination of the standstill state is frequently carried out at the carriage level or locally depending on signals provided by sensors disposed on the carriage. Such sensors can for example be axle speed sensors of an anti-wheel slide means. If sensors fail, the standstill determination can be difficult or even no longer carried out.

Disclosed embodiments enable reliable standstill determination at low cost.

BRIEF DESCRIPTION OF THE FIGURES

The invention will now be explained with reference to the accompanying FIGURE using exemplary embodiments by way of example.

FIG. 1 shows schematically an example of a control arrangement that is designed to provide a standstill signal.

DETAILED DESCRIPTION OF THE DISCLOSED EMBODIMENTS

Disclosed embodiments relate to a control arrangement for a rail vehicle with at least one control device that is or can be connected for the reception of sensor signals, wherein the sensor signals each represent at least a speed, as well as with at least one bus connector, by means of which the control device is or can be connected to a data bus of the rail vehicle for data exchange. The control device is designed to produce a standstill signal based on the sensor signals and to transfer it on the data bus. The control arrangement also comprises a standstill determination device that can receive standstill signals by means of the data bus and that is designed to determine whether the rail vehicle is at a standstill based on standstill signals received by means of the data bus. Thus standstill signals, which can be analyzed locally by a standstill determination device, can be provided by means of a data bus that can connect a plurality of carriages to each other. A local standstill determination can therefore be carried out based on a plurality of sensor signals. A reliable standstill determination can thus be carried out even if one or more sensors on a carriage fail. The sensor signals can be provided by suitable sensors, which can be parts of the control arrangement or separate therefrom. The sensors can for example comprise axle speed sensors or revolution rate sensors of an anti-wheel slide means. A sensor can also be a radar-based or optical sensor that enables a speed measurement. A sensor can generally be designed to measure a variable that represents a speed, in particular a vehicle speed and/or a carriage speed. A variable can generally be viewed as representing a speed if a speed can be determined and/or calculated therefrom, possibly using additional parameters such as e.g. a wheel diameter. A sensor signal that indicates such a variable can be viewed as a signal representing a speed. A control device can be respectively connected or be able to be connected to a plurality of sensors. It is conceivable that the sensors are designed to determine a speed independently of each other. For example, axle speed sensors associated with a plurality of different axles can be provided that can each determine the speed of an axle independently of each other. It will be understood that in principle a vehicle speed can be determined from an axle speed during a normal operating state of a rail vehicle if for example there is no sliding state during braking. Each electronic control device can be associated with at least one bus connector. It is conceivable that an electronic control device that is connected or able to be connected to the data bus is provided for each of a plurality of carriages. A data bus can be a data bus that is provided segment-wide or vehicle-wide, for example a Multifunction Vehicle Bus (MVB). The standstill determination device and the electronic control device can be implemented within a common device, for example a computer and/or microcontroller. The electronic control device can comprise a suitable program code and interfaces to receive, process and transfer the corresponding signal. The control device can in particular be implemented as part of a brake control device of a carriage.

The control device can be designed to receive sensor signals from a plurality of sensors and to produce a standstill signal that contains at least one item of standstill information for each of a plurality of speeds represented by the sensor signals. An item of standstill information can in particular have a data width of one bit. An existing data width of the bus can thus be used efficiently.

It can be provided that the control device is designed to check the validity for each received sensor signal. The check can be a plausibility check for example. The control device can be designed to check whether the variable and/or its time profile described by the sensor signal lies within specified parameter ranges. It can also be provided that the control device is designed to receive a corresponding validity signal.

Furthermore, the control device can be designed to produce a standstill signal that indicates the validity of each item of standstill information. The validity can be indicated by a respective validity signal that can have a data width of one bit.

The standstill determination device can be designed to receive a reference speed signal. The reference speed signal can indicate a reference speed. It is conceivable that the reference speed signal is provided by an external device of the vehicle, for example by a central computer, a brake control device or an anti-wheel slide means. It can be provided that the standstill determination device is designed to receive or to produce a signal indicating the validity of the reference speed signal. The standstill determination device can be designed to carry out a plausibility check or a check of the signal or of the time profile of the signal for its admissibility, for example whether the represented variable or the time dependency or the time derivative lie within a predetermined parameter range.

In particular, the standstill determination device can be designed to determine whether the rail vehicle is at a standstill based on the reference speed signal. A level of redundancy can thus be provided. It can for example be provided that the standstill determination device is designed to only then determine that a standstill state exists if the reference speed is below a predetermined speed limit.

The control arrangement can be designed to determine the existence of a standstill of the vehicle at the carriage level. In particular, a control device can be provided on each of a plurality of carriages that takes into account standstill signals provided by means of the data bus from other carriages and/or their control devices for determining a standstill state.

Moreover, disclosed embodiments relate to a rail vehicle with the control arrangement that is described herein.

The rail vehicle can comprise a plurality of carriages, each with an electronic control device, that are or can be connected to each other by means of a data bus.

Moreover, disclosed embodiments relate to a method for determining whether a rail vehicle is at a standstill, in particular a rail vehicle described herein. The method comprises the steps of the generation by at least one electronic control device of a standstill signal in each case based on sensor signals, each of which represents at least one speed, and of the transfer by the at least one electronic control device of the respective standstill signal on a data bus, as well as the determination by a standstill determination device of whether a standstill state of the vehicle exists based on standstill signals received by means of the data bus.

FIG. 1 shows an example of a control arrangement 10 for providing a standstill signal. The control arrangement 10 is implemented in this example on a segment of a rail vehicle that comprises four carriages 12, 14, 16 and 18. It will be understood that the control arrangement 10 can be implemented for differently organized vehicle segments or vehicle-wide. An electronic control device 20 is provided on each of the carriages 12, 14, 16, 18. The control devices 20 are each connected by means of a bus connector to a data bus 22, which can be a Multifunction Vehicle Bus (MVB) for example. The data bus 22 can be of vehicle-wide or segment-wide form. In this example it is assumed that each of the carriages 12, 14, 16, 18 comprises two bogies, each with two wheel axles. Each wheel axle is associated with a speed sensor that is able to monitor the wheel axle, in particular the rotation of the wheel axle. It is conceivable that not every wheel axle is associated with a sensor. A sensor is designed to provide a sensor signal that represents an axle speed. Such a signal can for example indicate a rotation frequency or a speed determined from the monitoring of the rotation of the axle. Suitable sensors are for example wheel axle monitoring sensors of an anti-wheel slide means, which for example monitor a revolution rate of an axle or of a wheel. It is however also conceivable that the sensors alternatively or additionally produce a speed representing signal in a different way, for example by means of radar measurement, GPS or optically. Each sensor is designed to transfer a sensor signal AV-N that represents the determined axle speed to a first electronic control device 20. Here N stands in each case for a numerical designation of the sensor or the wheel axle monitored by the sensor. In this example N runs from 1 to 4 for each carriage. Accordingly, AV-1 refers to a signal that represents the axle speed determined by the sensor monitoring the first axle, AV-2 describes the axle speed measured by the second sensor and so on. In this example it is provided that each electronic control device 20 receives sensor signals from sensors that are disposed on the same carriage as the control device 20 and/or that monitor the wheel axles of the same carriage. The sensor signals can be analog or digital signals, in particular digital, signals with a multiple bit data width, which the electronic control device 20 can receive and/or process. The electronic control device 20 can be designed to assess the validity of the sensor signals AV-V and/or to receive a corresponding validity signal. The validity of a signal can for example be assessed by a plausibility analysis of the signal or of a signal change. It can for example be provided to check whether the signal or its time derivative is within or outside a certain predefined parameter range and/or is invalid for physical reasons. It can be provided that an electronic control device 20 is designed to carry out a corresponding validity check in each case. It is also conceivable that an upstream control device or a sensor is designed to carry out such a check and to transfer a corresponding validity signal to the electronic control device 20. A signal VR that indicates a reference speed is also fed to the control device 20. The reference speed VR can indicate a vehicle speed that can be provided by a vehicle-wide, segment-wide or local device. The reference speed VR can for example be provided by a trip computer of a train, a braking computer and/or an anti-wheel slide means, in particular an anti-wheel slide computer of a carriage. The reference speed can represent a vehicle speed and can be determined from measurement results of one or a plurality of sensor devices, for example from revolution rates of the wheel axles of one or a plurality of carriages provided by a plurality of anti-slide sensors, in particular of the carriage on which the respective control device 20 is disposed, and/or radar measurements and/or other sensor devices for speed determination. A signal VV that indicates the validity of the reference speed signal is also fed to the electronic control device 20. The control device 20 is designed to produce or to calculate a standstill signal BA-N based on each axle speed signal AV-N. A standstill signal BA-N can be provided to indicate whether the respective axle speed AV-N can suggest a standstill state of the associated axle and/or of the vehicle. A standstill signal BA-N can in particular have a data width of one bit. The control device 20 can be designed to compare a sensor signal AV-N with a limit value that can represent a speed limit. If the speed represented by a sensor signal AV-N is below the speed limit, which for example can be 3 km/h-5 km/h, the control device 20 can produce standstill information indicating a standstill state, in this example, an axle standstill signal BA-N. If the speed represented by a sensor signal AV-N is above the speed limit, the control device 20 can provide standstill information by an axle standstill signal BA-N that indicates that the relevant axle cannot be concluded to be at a standstill state. The control device 20 is also designed to provide a validity signal GA-N associated with each axle standstill signal BA-N. Each validity signal GA-N indicates whether the associated axle standstill signal BA-N is valid and/or is based on a valid sensor signal. Each of the signals BA-N and GA-N has a data width of one bit. The electronic control device 20 is designed to form corresponding signals BA-N and GA-N for each of the sensors that are disposed on its associated carriage. The electronic control device 20 is also designed to group the corresponding signals BA-N and GA-N into a standstill signal group 21 and to send the signal group 21 as a carriage standstill signal SD-12 by means of the data bus 22. If, as in the present case, each carriage comprises four axle speed sensors, for each of which the signals BA-N and GA-N are produced and placed on the data bus 22, then the resulting carriage standstill signal SD-12 placed by an electronic control device 20 on the data bus has an overall data width of 1 byte. A suitable control device 20 is provided on each of the four carriages 12, 14, 16, 18 shown of the segment or vehicle, so that in this example a total of 4 bytes are sent on the data bus 22 for the standstill determination, i.e. the carriage standstill signals SD-14, SD-16 and SD-18. Each of the carriages also has a standstill determination device 24, which is connected to the data bus 22 for receiving data. The standstill determination device 24 can be of hardware and/or software form, for example as a program and/or module. Accordingly, the connections for data transmission shown in FIG. 1 can be of a hardware and/or software form, for example as data interfaces and/or program interfaces or memory interfaces. It is for example conceivable that the standstill determination device 24 is a separate control device. The standstill determination device 24 can be implemented within or as part of the electronic control device 20. The standstill determination device 24 is generally designed to receive the standstill signals SD-12, SD-14, SD-16, SD-18 originating from all carriages belonging to the segment and/or connected to the data bus. It will be understood that a standstill determination device 24 can be designed to receive the local standstill signal, for example SD-12 for carriage 12, from the associated control device 20, instead of reading it from the data bus 22. The standstill determination device 24 also receives the signals VR and VV, which in this example can be transmitted from the electronic control device 20 on each carriage to the associated standstill determination device 24. It is also conceivable that the reference signals VR and VV can be transmitted to the standstill determination device 24 while bypassing the electronic control device 20. In general, the control device 20 and/or the standstill determination device 24 can be implemented as or as part of a brake control device of a carriage. The standstill determination device 24 is designed to determine whether a standstill state of the vehicle exists based on the standstill signals SD-12, SD-14, SD-16 and SD-18 and the reference speed VR. In total in the example shown there are 16 axle standstill signals BA-N and associated validity signals GA-N for each standstill determination device 24, which are encoded in the standstill signals and each of which has a data width of one bit. To assess whether a standstill state of the vehicle exists, standstill signals identified as invalid and/or an invalid reference speed may be ignored. A threshold value is formed based on the number of valid standstill signals. Depending on the number of valid standstill signals, the threshold value indicates from what number of axle standstill signals that indicate a standstill state a standstill state can actually be assumed. It can be provided that the standstill determination device 24 is designed to only identify a standstill state if the reference speed is below a specified reference limit value, which can lie for example between 3 and 5 km/h. Should the number of axle standstill signals that indicate that a standstill state exists be less than the defined threshold value, then it can be assumed that no standstill state exists. For this consideration it is not necessary to compare the reference speed with the speed limit. In particular, the standstill determination device 24 can be designed to cancel a state in which a standstill state is identified if the number of axle standstill signals falls below the threshold value. It will be understood that the control arrangement 10 can be designed to carry out continuous monitoring of the vehicle speed and in particular can be designed to produce the standstill signals SD-12 to SD-18 periodically and to check whether a standstill state exists. The standstill determination device can be designed to provide a result signal SI and a result validity signal SV, which indicate whether a standstill state exists and whether the standstill signal is valid. The signals can be delivered onto the bus. It is also conceivable for the result signal to be used locally at the carriage level. For example, the result signal can be used to control a door release or door opening function and/or for a fault diagnosis. It can also be provided for different vehicle equipment or carriage equipment that is activated in the standstill state of the vehicle or when the vehicle is travelling to be activated or deactivated based on the result signal.

The features of the embodiments disclosed in the above description, in the FIGURES as well as in the claims can be essential for implementing the invention both individually and also in any combination.

| Reference character list | |
|---|---|
| 10 | control arrangement |
| 12, 14, 16, 18 | carriages |
| 20 | control device |
| 21 | standstill signal group |
| 22 | data bus |
| 24 | standstill determination device |
| AV-1, AV-2, AV-3, AV-4 | axle speed signals |
| BA-1, BA-2, BA-3, BA-4 | axle standstill signals; items of standstill information |
| GA-2, GA-2, GA-3, GA-4 | validity signals |
| SD-12, SD-14, SD-16, SD-18 | standstill signals |
| SI | result signal |
| SV | result validity signal |
| VR | reference speed signal |
| VV | reference speed signal validity signal |

The invention claimed is:

1. A control arrangement for a rail vehicle, the control arrangement comprising:
   at least one control device for connection for receiving sensor signals, wherein the sensor signals each represent at least one speed;
   at least one bus connector, which connects the control device to a data bus of the rail vehicle for data exchange, wherein the control device produces a standstill signal based on the sensor signals and transfers the standstill signal on the data bus;
   a standstill determination device that can receive standstill signals from the data bus,
   wherein the standstill determination device determines whether the rail vehicle is at a standstill based on standstill signals received from the data bus; and
   wherein the control device receives sensor signals from a plurality of sensors on the rail vehicle and produces a standstill signal that contains at least one item of standstill information for each of a plurality of speeds represented by the sensor signals.

2. The control arrangement of claim 1, wherein the control device checks a validity for each received sensor signal.

3. The control arrangement of claim 1, wherein the control device produces a standstill signal that indicates its validity for each item of standstill information.

4. The control arrangement of claim 1, wherein the standstill determination device receives a reference speed signal.

5. The control arrangement of claim 4, wherein the standstill determination device determines whether the rail vehicle is at a standstill based on the reference speed signal.

6. The control arrangement of claim 1, wherein the control arrangement determines the existence of a standstill of the vehicle at the carriage level.

7. The control arrangement of claim 1, the plurality of sensors on the rail vehicle are each configured to sense a revolution rate of a different axle or wheel.

8. A rail vehicle with a control arrangement for a rail vehicle, the control arrangement comprising:
- at least one control device, which is connected or can be connected for receiving sensor signals from a plurality of independent sensors, wherein the sensor signals each represent at least one speed;
- at least one bus connector, by which the control device is connected or can be connected for data exchange to a data bus of the rail vehicle, wherein the control device produces a standstill signal based on the sensor signals and transfers the standstill signal on the data bus; and
- a standstill determination device that can receive standstill signals from the data bus, wherein the standstill determination device determines whether the rail vehicle is at a standstill based on standstill signals received from the data bus.

9. The rail vehicle of claim 8, wherein the rail vehicle comprises a plurality of carriages, each with an electronic control device, which are or can be connected to each other by a data bus.

10. The rail vehicle of claim 8, wherein the plurality of independent sensors are each configured to sense a revolution rate of a different axle or wheel.

11. A method for determining whether the rail vehicle of claim 8 is at a standstill, the method comprising: producing a standstill signal by at least one electronic control device based on sensor signals received from a plurality of independent sensors, each of which represents at least one speed; transferring the respective standstill signal on a data bus by the at least one electronic control device; determining by a standstill determination device whether a vehicle standstill state exists based on standstill signals received by the data bus.

12. The method of claim 11, wherein the plurality of independent sensors are each configured to sense a revolution rate of a different axle or wheel.

* * * * *